US008626456B2

(12) United States Patent
Moore et al.

(10) Patent No.: US 8,626,456 B2
(45) Date of Patent: Jan. 7, 2014

(54) METHODS FOR DETERMINING A REMAINING USEFUL LIFE OF AN AIR FILTER

(75) Inventors: Joseph K. Moore, Whitby (CA); Terry W. Ostan, Whitby (CA); Lei Li, Whitby (CA); Jackson L. Bahm, Bloomfield Hills, MI (US); Philip J. Fikany, Troy, MI (US); Thomas J. Mockeridge, Holly, MI (US); Dennis P. Stenson, Highland, MI (US); Steven J. McCormick, Goodrich, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 342 days.

(21) Appl. No.: 12/729,697

(22) Filed: Mar. 23, 2010

(65) Prior Publication Data

US 2011/0238331 A1 Sep. 29, 2011

(51) Int. Cl.
*G01F 1/20* (2006.01)
*G01F 1/05* (2006.01)
*G06F 3/01* (2006.01)
*G06F 13/10* (2006.01)

(52) U.S. Cl.
USPC ................ 702/47; 702/45; 702/184; 702/185

(58) Field of Classification Search
USPC ............... 702/24, 45, 47, 100, 132, 182, 184, 702/185, 189; 55/486; 95/270; 96/64; 123/184.34; 340/607
See application file for complete search history.

(56) References Cited

U.S. PATENT DOCUMENTS

| | | | |
|---|---|---|---|
| 5,604,306 A | 2/1997 | Schricker | |
| 5,606,311 A | 2/1997 | Polidan et al. | |
| 5,858,044 A * | 1/1999 | Nepsund et al. | 55/486 |
| 6,277,176 B1 * | 8/2001 | Tang et al. | 95/270 |
| 6,675,756 B2 * | 1/2004 | Katayama | 123/184.34 |
| 6,884,274 B2 * | 4/2005 | Niakan et al. | 55/486 |
| 7,032,573 B2 | 4/2006 | Ardisana | |
| 7,305,301 B1 | 12/2007 | Wang et al. | |
| 7,441,449 B2 | 10/2008 | Wang et al. | |

(Continued)

OTHER PUBLICATIONS

Thome, K., "Develop and demonstrate a software algorithm to monitor onboard air filter life for an air induction system," Mechanical Engineering Thesis II, Jun. 2007, Kettering University, Flint MI.

(Continued)

*Primary Examiner* — Eliseo Ramos-Feliciano
*Assistant Examiner* — Felix Suarez
(74) *Attorney, Agent, or Firm* — Ingrassia Fisher & Lorenz, P.C.

(57) ABSTRACT

A method is provided herein for determining a remaining useful life of an air filter. The method includes, but is not limited to, measuring a first airflow rate and a first air pressure ($P_1$) in an air cleaner assembly downstream of the air filter, wherein $P_1$ corresponds to the first airflow rate. The method further includes measuring a second airflow rate and a second air pressure ($P_2$) in the air cleaner assembly downstream of the air filter, wherein $P_2$ corresponds to the second airflow rate. The method further includes obtaining pressure differentials $A_1$, $A_2$, $B_1$, and $B_2$ from a data storage device. The method also includes calculating with a processor a result indicative of a useful life remaining for the air filter by taking into account $P_1$, $P_2$, $A_1$, $A_2$, $B_1$, and $B_2$. The method also includes reporting the result to a user.

20 Claims, 5 Drawing Sheets

(56) References Cited

U.S. PATENT DOCUMENTS

| | | | | |
|---|---|---|---|---|
| 7,441,450 | B2 | 10/2008 | McClain et al. | |
| 7,444,234 | B2 | 10/2008 | Bauerle | |
| 7,591,173 | B2 | 9/2009 | Benscoter et al. | |
| 7,655,076 | B2 * | 2/2010 | Griffiths et al. | 96/64 |
| 7,777,633 | B2 * | 8/2010 | Knox et al. | 340/607 |
| 2005/0240338 | A1 | 10/2005 | Ardisana | |
| 2007/0146148 | A1 * | 6/2007 | Kawasaki et al. | 340/607 |
| 2008/0223123 | A1 | 9/2008 | Wang et al. | |

OTHER PUBLICATIONS

China Patent & Trademark Office, Chinese Office Action for Chinese Patent Application No. 201110070593.5, mailed Mar. 29, 2013.

* cited by examiner

METHODS FOR DETERMINING A REMAINING USEFUL LIFE OF AN AIR FILTER

TECHNICAL FIELD

The technical field generally relates to filters, and more particularly relates to air filters.

BACKGROUND

Air filters, such as those used in air cleaner assemblies which filter particulate matter out of an air stream prior to its introduction into the combustion chamber of a vehicle's internal combustion engine, periodically clog and need to be replaced. Such air filters have historically been monitored in an indirect manner to determine when they should be replaced. For example, the number of miles driven by a vehicle since its last air filter replacement is commonly used as a means for determining when it is time to replace a vehicle's air filter. Using miles driven as a basis for making this determination relies on a correlation between the miles driven by the vehicle and the rate at which the vehicle's air filter clogs with particulates.

Although such a method of determining when to replace a vehicle's air filter is adequate, there is room for improvement. This is because the correlation between miles driven by a vehicle and the clogged state of the vehicle's air filter can be affected by the type of environment in which the vehicle is driven. For example, the air filter of a vehicle that is routinely driven through a desert environment will clog at a rate that differs from a vehicle that is routinely driven through an arctic environment because of the difference between the amount of particulate matter suspended in the air of each environment. This difference between environments, as well as other factors, can vary the correlation between the miles driven and the condition of a vehicle's air filter. This, in turn, can diminish the effectiveness of using miles driven as a predictor of when a vehicle's air filter needs to be replaced.

Furthermore, hybrid electric vehicles, plug-in hybrid electric vehicles, extended range electric vehicles, and vehicles operated using other non-traditional power sources, are being introduced into the marketplace. Such vehicles may, at various times and/or for unpredictable periods of time, be powered exclusively by their electric motors. During periods of time when their internal combustion engines are not utilized, the air filters on these new types of vehicles will not clog with particulate matter. Accordingly, the number of miles driven by these vehicles may not be an acceptable means of predicting the condition of their air filters.

SUMMARY

Methods are provided herein for determining a remaining useful life of an air filter.

In an example, the method includes, but is not limited to, measuring a first airflow rate and a first air pressure ($P_1$) in an air cleaner assembly downstream of the air filter. $P_1$ corresponds to the first airflow rate. The method further includes measuring a second airflow rate and a second air pressure ($P_2$) in the air cleaner assembly downstream of the air filter. $P_2$ corresponds to the second airflow rate. The method further includes obtaining pressure differentials across a new air filter at the first airflow rate ($A_1$), across the new air filter at the second airflow rate ($A_2$), across an end-of-life air filter at the first airflow rate ($B_1$) and across the end-of-life air filter at the second airflow rate ($B_2$) from a data storage device. The method further includes calculating with a processor a result indicative of a useful life remaining for the air filter by taking into account $P_1$, $P_2$, $A_1$, $A_2$, $B_1$, and $B_2$. The method still further includes reporting the result to a user.

In another example, the method includes, but is not limited to a step (a) of measuring a first airflow rate and a first air pressure ($P_1$) in an air cleaner assembly downstream of the air filter. $P_1$ corresponds to the first airflow rate. The method further includes a step (b) of measuring a second airflow rate and a second air pressure ($P_2$) in the air cleaner assembly downstream of the air filter. $P_2$ corresponds to the second airflow rate. The method further includes a step (c) of obtaining pressure differentials across a new air filter at the first airflow rate ($A_1$), across the new air filter at the second airflow rate ($A_2$), across an end-of-life air filter at the first airflow rate ($B_1$) and across the end-of-life air filter at the second airflow rate ($B_2$) from a data storage device. The method further includes a step (d) of calculating with a processor a result indicative of a useful life remaining for the air filter by taking into account $P_1$, $P_2$, $A_1$, $A_2$, $B_1$, and $B_2$. The method further includes a step (e) of repeating steps a through d until a predetermined number of results has been calculated. The method further includes a step (f) of calculating an average result by averaging the predetermined number of results with a processor. The method still further includes a step (g) of reporting the average result to a user.

In yet another example, the method includes, but is not limited to measuring a first airflow rate in an air cleaner assembly downstream of the air filter and a pressure differential ($\Delta P$) across the air filter. The pressure differential corresponds to the first airflow rate. The method further includes obtaining pressure differentials across a new air filter at the first airflow rate ($A_1$) and across an end-of-life air filter at the first airflow rate ($B_1$) from a data storage device. The method further includes calculating with a processor a result indicative of a useful life remaining for the air filter by taking into account $\Delta P$, $A_1$, and $B_1$. The method still further includes reporting the result to a user.

DESCRIPTION OF THE DRAWINGS

One or more embodiments will hereinafter be described in conjunction with the following drawing figures, wherein like numerals denote like elements.

DETAILED DESCRIPTION

Figure 1:
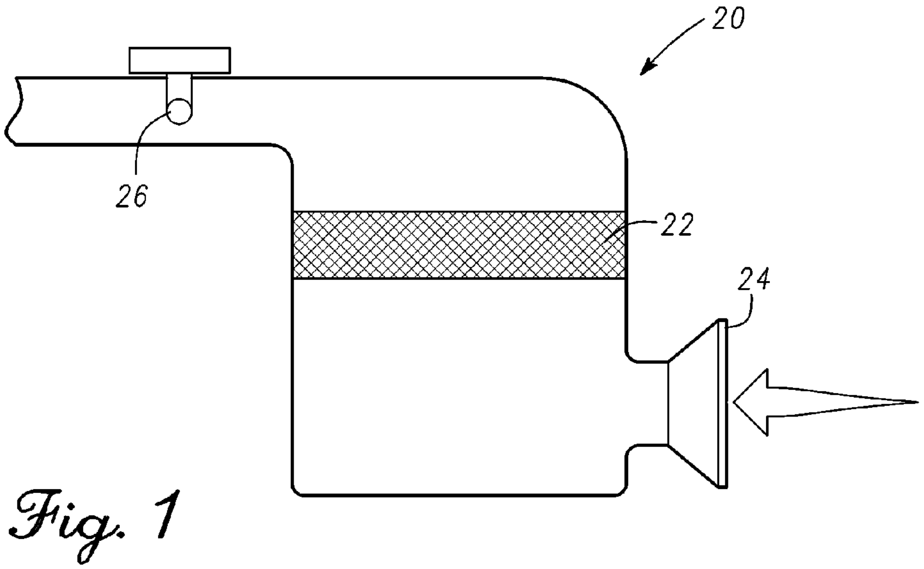
FIG. 1 is a simplified side view of an air cleaner assembly compatible for use with an example of a method for determining a remaining useful life of an air filter.

The following detailed description is merely exemplary in nature and is not intended to limit application and uses. Furthermore, there is no intention to be bound by any expressed or implied theory presented in the preceding technical field, background, brief summary or the following detailed description.

Improved methods for determining when to replace a vehicle's air filter are disclosed herein. The improved methods include taking air pressure measurements in an air cleaner assembly having an air filter, obtaining data related to pressure differentials observed in new air filters and end-of-life air filters, and using the measured pressure and the pressure differential data to compute the useful life remaining for the air filter.

The methods include taking at least two measurements of the air pressure in an air cleaner assembly at a location downstream of the air filter (i.e., the air pressure measurements are taken at a location within the air cleaner assembly after the air has passed through the air filter). One measurement is taken at a high airflow rate and the other measurement is taken at a low airflow rate. As used herein, the terms "high airflow rate" and "low airflow rate" are relative terms meaning that the high airflow rate must be higher than the low airflow rate and vice versa. In some implementations, the sequence of such measurements is irrelevant. The two air pressure measurements may be referred to herein as "paired data". The paired data, taken together with the data relating to pressure differentials across new and end-of-life air filters, are used to calculate the useful life remaining for the air filter.

The two pressure measurements in each set of paired data are preferably taken within a predetermined period of time of one another to minimize errors that might otherwise result from changing atmospheric pressure due to changing weather conditions, changing elevations, changing geographic location, or other factors. The length of the predetermined period of time may vary depending on geographical, seasonal, and/or other considerations. In some examples the predetermined period of time may be less than or equal to 2-30 seconds.

Additionally, each measurement is preferably not taken until after the air flow has reached a steady state condition. As used herein, the term "steady state condition" in connection with air flow refers to a condition where fluctuations in air flow do not exceed a predetermined value. In some examples, it may be desirable to set the predetermined value for fluctuations in the air flow rate at less than or equal to approximately 1-20 grams/second.

The useful life remaining for a particular air filter may be calculated by taking only a single downstream air pressure measurement in an air cleaner assembly as the air flows through the air cleaner assembly at a first known airflow rate. To do so, the following equation is used:

$$Z\% = \frac{100 \times (B_1 - (P_{atm} - P_1))}{(B_1 - A_1)} \qquad \text{Equation \#1}$$

The variables presented in the above equation represent the following values:

Z % is the useful life remaining and is measured as a percent;

$B_1$ is the known pressure differential across an end-of-life air filter at the first known airflow rate ("the first airflow rate");

$P_{atm}$ is the prevailing atmospheric pressure;

$P_1$ is the air pressure measured downstream of the air filter at the first airflow rate; and $A_1$ is the known pressure differential across a new air filter at the first airflow rate.

As illustrated above, when only a single downstream air pressure measurement is taken, the atmospheric pressure must also be measured in order to calculate the useful life remaining for an air filter. The variables $A_1$ and $B_1$ may be obtained through laboratory testing of new and end-of-life air filters, respectively. As used herein, the term "end-of-life air filter" refers to an air filter that is clogged with particulate matter to an extent that causes a drop in pressure between an upstream side and a downstream side of the air filter that is greater than or equal to a predetermined pressure differential. In one example, when the pressure differential across an air filter is greater than or equal to 2.5 kPa at an airflow rate of 200 gms/s, that air filter has reached the end of its useful life and would be referred to as an end-of-life air filter. Pressure differentials across new and end-of-life air filters may be determined in laboratory testing throughout any desired range of airflow rates. One such range of airflow rates may include a range of airflow rates expected or historically encountered through a vehicle's air cleaner assembly.

Once the pressure differentials across the new and end-of-life air filters have been measured for the desired range of airflow rates, then equation #1 may be used to determine the useful life remaining for the air filter by taking an atmospheric pressure measurement and only a single downstream air pressure measurement at any flow rate that falls within the range of tested airflow rates. For example, if the airflow rate changes to a second airflow rate (i.e. a rate that differs from the first airflow rate) and if the second airflow rate falls within the range of tested airflow rates, then the useful life remaining for the air filter can be determined by taking an atmospheric pressure measurement, a second downstream air pressure measurement, and then performing the following calculation:

$$Z\% = \frac{100 \times (B_2 - (P_{atm} - P_2))}{(B_2 - A_2)} \qquad \text{Equation \#2}$$

The variables presented in this second equation represent the following values:

Z % is the useful life remaining;

$B_2$ is the pressure differential across an end-of-life air filter at the second known airflow rate ("the second airflow rate");

$P_{atm}$ is the prevailing atmospheric pressure;

$P_2$ is the air pressure measured downstream of the air filter at the second airflow rate; and $A_2$ is the pressure differential across a new air filter at the second airflow rate.

If the first calculation is made within a relatively short period of time of the second calculation, then the first calculated useful life remaining will be substantially equal to the second calculated useful life remaining. This is because the calculations pertain to the same air filter. Accordingly, the first and the second equations above can be rewritten to mathematically eliminate $P_{atm}$. Once $P_{atm}$ has been eliminated from the equation, the useful life remaining for an air filter can be calculated as follows:

$$Z\% = \frac{100 \times ((P_1 - P_2) + (B_1 - B_2))}{((B_1 - A_1) - (B_2 - A_2))} \quad \text{Equation \#3}$$

Thus, the use of paired data eliminates the need to obtain atmospheric pressure measurements in order to determine the useful life remaining for an air filter. Because atmospheric pressure measurements are not required, atmospheric pressure measuring systems will likewise not be required and the cost and complexity of the vehicle implementing such methods can be reduced and/or contained.

Methods which rely on equation #3 to determine the useful life remaining for air filters may encounter some error arising out of the slight changes in atmospheric pressure that may occur during the time between the taking of the first and the second pressure measurements of the paired data. Also, the measuring equipment itself may have an inherent error rate that can impact the calculation of useful life remaining for an air filter. One way of compensating for such errors is to collect multiple sets of paired data and to calculate a useful life remaining utilizing each of the sets of paired data. Each calculated result may be stored and once a predetermined number of results have been collected, the results can be averaged to arrive at an average useful life remaining for the vehicle's air filter.

The magnitude of the error in each measurement will vary directly with the magnitude of the difference in the airflow rates corresponding to the two measurements. Accordingly, in some examples, a larger number of data sets may be collected in instances where there is only a relatively small difference between the first and the second airflow rates. Conversely, fewer sets of paired data will be needed when there is a relatively large difference between the first airflow rate and the second airflow rate.

Other methods described herein do take atmospheric pressure into consideration. Such methods implement equation #1, recited above and require that a vehicle be equipped with atmospheric pressure measuring systems. While such a vehicle may be more complex and costly than a vehicle that employs a method which implements equation #3, potential errors associated with slight changes in atmospheric conditions can be eliminated.

A further understanding of the methods for determining the useful life remaining for an air filter may be obtained through a review of the illustrations accompanying this application together with a review of the detailed description that follows.

FIG. 1 is a simplified side view of an air cleaner assembly 20 compatible for use with an example of a method for determining a remaining useful life of an air filter 22. Air cleaner assembly 20 may be used on any vehicle having an internal combustion engine. Although air cleaner assembly 20 is discussed herein as being implemented on a vehicle, it should be understood that air cleaner assembly 20, as well as each of the methods discussed below, may be implemented on any system, machine or device that utilizes an internal combustion engine, including, without limitation, landscaping and recreational equipment.

Air cleaner assembly 20 is configured to take air in through an inlet 24 and to direct the air to flow through air filter 22 and then on to the internal combustion engine (not shown). Air cleaner assembly 20 further includes a sensor 26 that is configured to measure both ambient air pressure and mass airflow rate. In some embodiments, sensor 26 may be a throttle intake air pressure sensor. In other embodiments, separate sensors may be implemented to separately detect ambient air pressure and mass air flow rates. As illustrated, sensor 26 is positioned within air cleaner assembly 20 at a location downstream of air filter 22. Sensor 26 may be configured to provide the ambient air pressure and the mass airflow rate detected to another device including, but not limited to, a computer processor (not shown) and/or a data storage device (not shown). Such additional devices may be configured to store the measurements taken by sensor 26, to time and control the taking of pressure measurements, and to perform the calculations discussed above.

For example, the computer processor may send an instruction to sensor 26 to measure the ambient air pressure ($P_1$). Sensor 26 may provide $P_1$ and the airflow rate at the time $P_1$ was measured to the data storage device. Within a predetermined period of time, the computer processor may send a second instruction to sensor 26 to measure the ambient air pressure a second time ($P_2$). Sensor 26 may then provide $P_2$ and the airflow rate at the time $P_2$ was measured to the data storage device. The computer processor may then obtain from the data storage device the pressure differentials across new and end-of-life air filters that correspond to the airflow rates at which $P_1$ and $P_2$ were measured. Once the computer processor obtains $P_1$, $P_2$, and the pressure differentials from the data storage device, the computer processor can then perform the calculation indicated in equation #3, above, to determine a result indicative of the useful life remaining for air filter 22.

Figure 2:
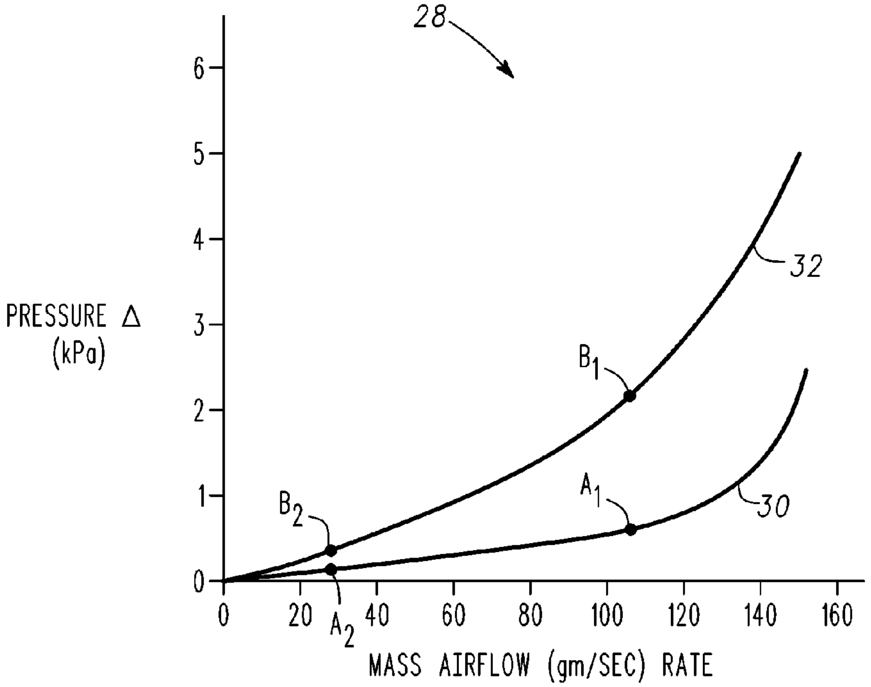
FIG. 2 is a chart illustrating pressure differentials measured across new and end-of-life air filters as a function of mass air flow.

FIG. 2 contains a chart 28 illustrating exemplary pressure differentials measured across both new and end-of-life air filters as a function of mass airflow. Along the X-axis are demarcations indicative of mass airflow in grams per second. Typical mass airflow rates encountered within air cleaner assemblies on conventional vehicles fall within the range of 2 gms/s to 400 gms/s. A portion of this range falls within the range illustrated in FIG. 2. Along the Y-axis are demarcations indicative of pressure differentials measured in kilopascals.

Chart 28 illustrates a first curve 30 and a second curve 32. First curve 30 is representative of exemplary laboratory-measured pressure differentials across a new air filter throughout the entire range of airflow rates indicated on the X-axis of chart 28. Similarly, second curve 32 is representative of exemplary laboratory-measured pressure differentials across an end-of-life air filter throughout the entire range of airflow rates indicated on the X-axis of chart 28. The data used to draw first and second curves 30, 32 may be contained on a data storage device in the form of a look-up table or in any other form effective to make the data accessible to the processor.

Two points along first curve 30, $A_1$ and $A_2$ have been identified. These points correspond to the pressure differential across a new air filter at mass airflow rates corresponding to the airflow rates at which $P_1$ and $P_2$ (from the example described above with reference to FIG. 1) were measured. Second curve 32 also includes two points, $B_1$ and $B_2$, which correspond to the pressure differential across an end-of-life air filter at the mass airflow rates corresponding to the airflow rates at which $P_1$ and $P_2$ were measured. Thus, in the example described above, when the computer processor obtains the pressure differentials from the data storage device, the data retrieved are the data points $A_1$, $A_2$, $B_1$, and $B_2$.

Figure 3:
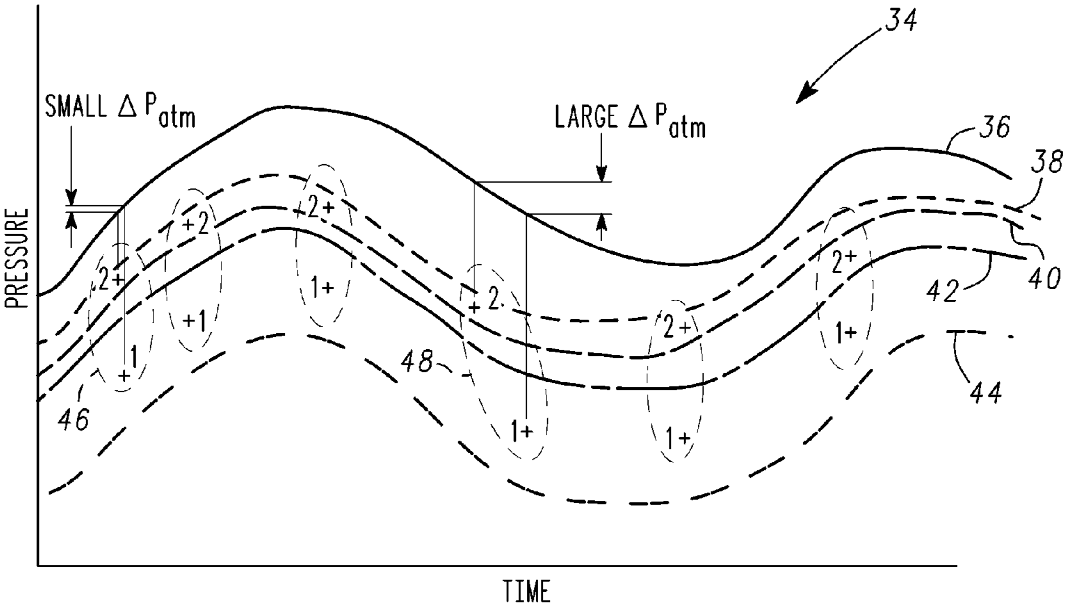
FIG. 3 is a chart illustrating variations in atmospheric pressure as a function of time and also illustrating downstream air pressures measured for new air filters and end-of-life air filters in correlation to variations in atmospheric pressure.

FIG. 3 contains a chart 34 illustrating variations in atmospheric pressure as a function of time and also illustrating downstream air pressures measured for new air filters and end-of-life air filters in correlation to variations in atmospheric pressure. The X-axis represents elapsed time and the Y-axis represents pressure. The variation of atmospheric pressure over time is illustrated by curve 36. The variation of downstream ambient air pressure in air cleaner assembly 20 across a new air filter at a low airflow rate is illustrated by a curve 38. The variation of downstream ambient air pressure in air cleaner assembly 20 across an end-of-life air filter at a low airflow rate is illustrated by a curve 40. The variation of downstream ambient air pressure in air cleaner assembly 20 across a new air filter at a high airflow rate is illustrated by a curve 42. And the variation of downstream ambient air pressure in air cleaner assembly 20 across an end-of-life air filter at a high airflow rate is illustrated by a curve 44. For ease of viewing, the differing curves shown in chart 34 are illustrated using different types of lines having different patterns that vary from solid lines to broken lines to dashed lines to dotted lines.

As illustrated by curve 36, atmospheric pressure rises and falls over time. As atmospheric pressure rises and falls, the downstream ambient air pressure behind the various air filters also rises and falls as indicated by the correspondence of the undulations of each of the illustrated curves on chart 34.

The respective positions of the various curves on chart 34 is explained as follows. Air cleaner assembly 20 draws air in through air filter 22. The more clogged that air filter 22 is, the greater will be the suction required to draw air through it. Also, the greater the airflow, the greater will be the suction that is required to draw air through air filter 22. As the suction increases, the drop off from atmospheric pressure correspondingly increases. Under these principles, a new air filter that is filtering air that is traveling at a slow airflow rate will experience a smaller drop off from atmospheric pressure than an end-of-life air filter filtering air at the same airflow rate. Similarly, an end-of-life air filter filtering air that is traveling at a slow airflow rate will experience a smaller drop off from atmospheric pressure than an end-of-life air filter filtering air that is traveling at a higher airflow rate because of the differences in suction required to move the air at differing rates.

Chart 34 also shows several sets of paired data. Each paired data set contains two downstream air pressure measurements. The lower downstream air pressure measurement in each set of paired data corresponds with a high airflow rate and the upper downstream air pressure measurement of each set of paired data corresponds with a low airflow rate.

Each downstream air pressure measurement within each set of paired data is taken within a predetermined period of time of one another. The predetermined period of time is preferably relatively short. The reason for this is to minimize any errors arising out of differences in atmospheric pressure measurements caused by fluctuations in the atmospheric pressure over time. If the two measurements are taken within a relatively short period of time, then the fluctuation in atmospheric pressure will necessarily be small and any error in the calculated useful life remaining for air filter 22 will be correspondingly small. This is best illustrated by first set of paired data 46. First set of paired data 46 contains two air pressure measurements that were taken within a predetermined period of time of one another. The dotted lines extending up from each individual air pressure measurement to curve 36 show a relatively small change in atmospheric pressure during the time elapsed between the taking of the two pressure measurements.

This is contrasted with a second set of paired data 48. The elapsed time between taking the first air pressure measurement and the second air pressure measurement of second set of paired data 48 exceeds the predetermined time. As a consequence, the fluctuation in atmospheric pressure from the time that the first air pressure measurement was taken to the time that the second air pressure measurement was taken is larger than was the case for first set of paired data 46. Consequently, use of second set of paired data 48 in equation #3 may result in an unacceptably inaccurate calculation of useful life remaining for air filter 22. Accordingly, second set of paired data 48 would be rejected by a processor implementing the methods disclosed herein.

Each set of paired data illustrated in FIG. 3 (except for second set of paired data 46) may be used to calculate a useful life remaining for filter 22. As discussed above, multiple calculations may be made and then averaged to compensate for the potential error inherent in each individual calculation.

Figure 4:
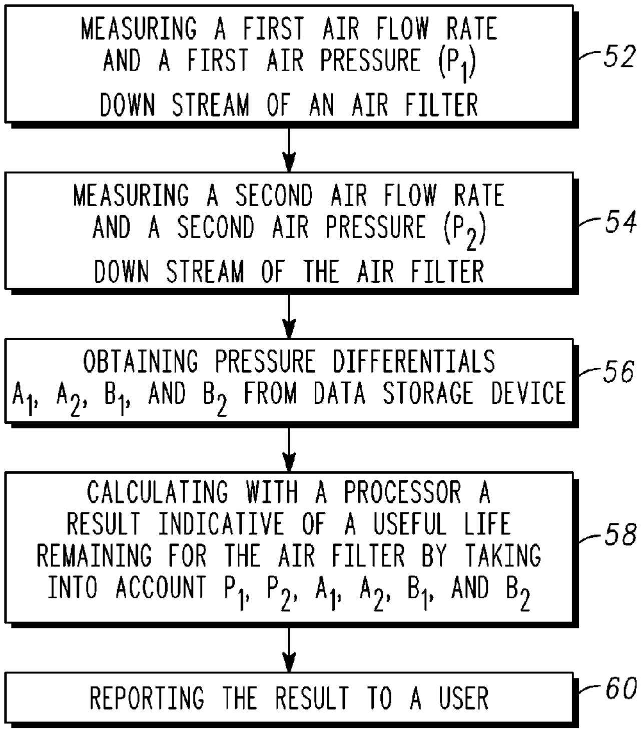
FIG. 4 is a flow diagram illustrating the steps of a first method that is compatible with the air cleaner assembly of FIG. 1, the method being capable of determining a remaining useful life of an air filter, according to an example.

FIG. 4 is a flow diagram illustrating the steps of a method 50 that is compatible with air cleaner assembly 20 of FIG. 1, method 50 being capable of determining a remaining useful life of an air filter, according to an example. It should be understood that method 50 is not limited to use with air cleaner assembly 20, but may also be performed utilizing other air cleaner assemblies as well.

At block 52, a first air pressure ($P_1$) and a first airflow rate are measured. The measurements may be taken using any conventional means including via a throttle intake air pressure sensor and a mass airflow sensor. These sensors are positioned within an air cleaner assembly having an air filter and are positioned on the downstream side of the air filter. The measurements may be communicated to a data storage device for recordation. Additionally, the time that such measurements were made may also be recorded and correlated with the measurements at the data storage device. In an embodiment, the taking of these measurements may be controlled by a single processor. The processor may be configured to communicate with the sensors and the data storage device, to provide commands to the sensors and the data storage device to measure and record, respectively, to coordinate the measuring activities of the various sensors, and to control the reporting of the measurements and the recording of such measurements by the data storage device.

In some examples of method 50, the air pressure is not measured until the airflow rate has reached a steady state. The steady state condition can be determined by processor as it receives measurements from the mass airflow sensor. When fluctuations in the airflow rate fall below a predetermined threshold, then the processor can prompt the throttle intake air pressure sensor (or any other suitable air pressure sensor) to measure the air pressure down stream of the air filter. It may be empirically determined for a particular vehicle or internal combustion engine that a steady state airflow rate may naturally occur within 0.03 seconds to 0.1 seconds of a change in engine speed or throttle position.

At block 54 a second air pressure ($P_2$) measurement and a second air flow measurement are made and recorded in the same manner as that described with respect to block 52. These second measurements will be made once the rate of airflow changes from the first airflow rate. A typical situation might include taking the first set of measurements as the vehicle idles and then taking the second set of measurements as the vehicle travels at speed. In some examples, it may be desirable to refrain from making the second set of measurements until the airflow rate through the air cleaner assembly changes from the first airflow rate by a predetermined amount. For example, it may be desirable to take the second set of measurements only after the rate of airflow has increased or decreased by 40 gms/s.

The second measurements are to be taken within a predetermined period of time of the first set of measurements. As illustrated in FIG. 3, atmospheric pressure varies over time and the more closely spaced in time that the first and the second measurements are made, the more accurate the calculation of the useful life remaining for the air filter will be.

At block 56, pressure differential data $A_1$, $A_2$, $B_1$, and $B_2$, corresponding to the first and the second airflow rates that were measured at blocks 52 and 54, are obtained. This may be accomplished by the processor retrieving the pressure differential data from the data storage device or from some other data source.

At block 58, a result is calculated that is indicative of the useful life remaining for the air filter. The result may be in the form of a percentage (e.g., 70% useful life remaining). This step may be performed by a processor that is configured to take into consideration the variables $P_1$, $P_2$, $A_1$, $A_2$, $B_1$, and $B_2$. In some examples, the processor may be configured to use the calculation described in equation #3, above, to calculate the useful life remaining for an air filter In some examples the processor may take into account an additional factor when calculating the useful life remaining for the air filter. For example, the result may be multiplied by percentage that is either greater or less than one hundred to skew the result in a desired direction. For example, if a user desires to replace air filters before they reach an end-of-life condition, then the result may be multiplied by a percentage that is less than one hundred to cause a reduction in the result and thereby create the appearance that the air filter is closer to the end of its useful life than it actually is. Conversely, if a user desires to continue to use an air filter after it reaches an end of life condition, the result may be multiplied by a percentage that is greater than one hundred to increase the result and thereby create the appearance that the air filter is further from the end of its useful life than it actually is. Such factors may be implemented in vehicles to allow users to selectively calibrate the system that calculates the useful life remaining of an air filter to have either an ecological bias (i.e., an early replacement of air filters) or an economic bias (i.e., a delayed replacement of air filters).

At block 60, the result (i.e., the useful life remaining) is reported to a user. This may be accomplished by flashing a warning or a message on a cockpit mounted display such as a driver information center. Such message may be a presentation of the percentage of useful life remaining, a percentage of useful life consumed, a graphic image conveying the life status of the air filter, synthesized information such as text which instructs a user to replace an air filter soon, or in any other method effective to communicate the condition of the air filter to the user.

Figure 5:
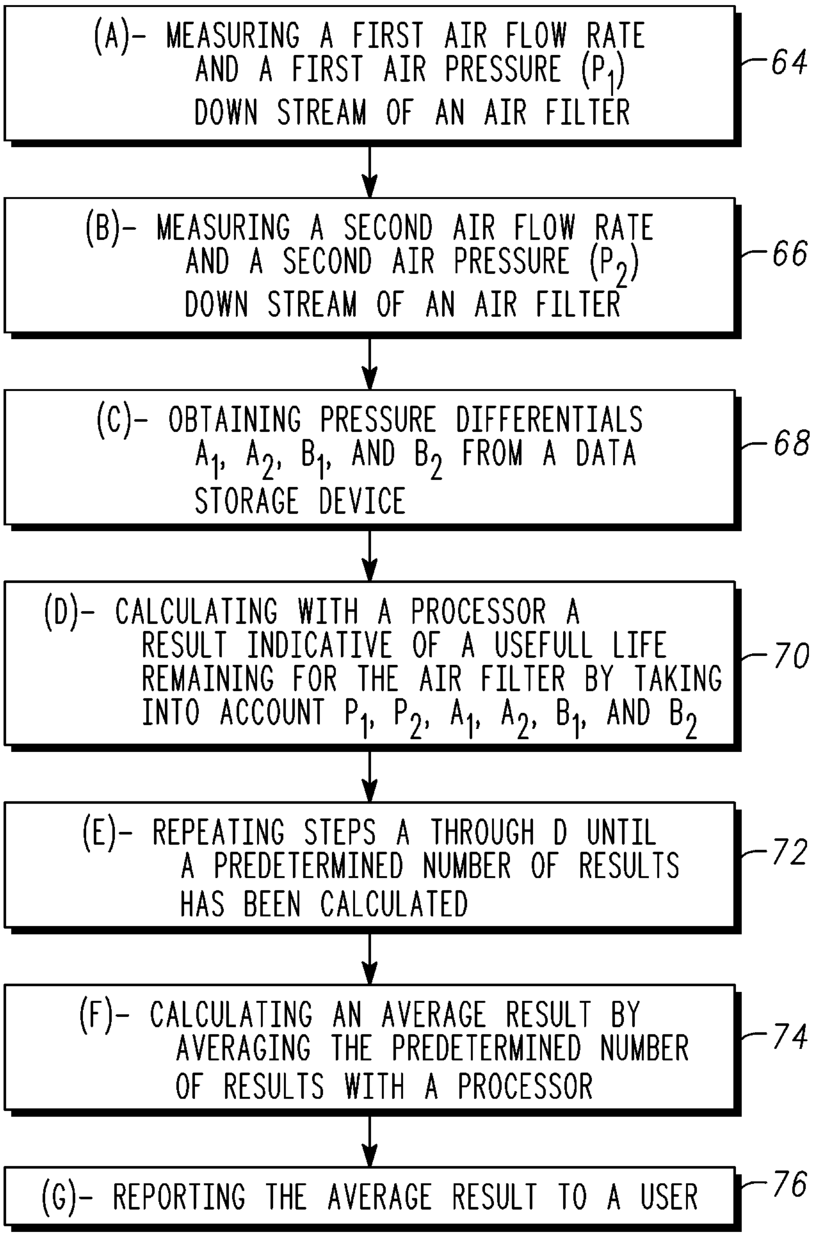
FIG. 5 is a flow diagram illustrating the steps of another method that is compatible with the air cleaner assembly of FIG. 1, the method being capable of determining a remaining useful life of an air filter, according to another example.

FIG. 5 is a flow diagram illustrating the steps of another method 62 that is compatible with air cleaner assembly 20 of FIG. 1, method 62 being capable of determining a remaining useful life of an air filter, according to another example. Steps one through four of method 62, illustrated in blocks 64 through 70, are identical to the steps of method 50 illustrated at block 52 through 58. For the sake of brevity, the discussion of steps one through four of method 62 will not be repeated here.

At block 72, method 62 requires that steps one through four be repeated until a predetermined number of results (i.e., the calculated useful life remaining for the air filter) have been calculated. Method 62 requires that multiple results be calculated to offset any potential impact caused by errors arising out of changes in atmospheric pressure between the first and the second air pressure measurement and also any error inherent in the signals sent by the sensors detecting air pressure and airflow rates. As the differential between the first airflow rate and the second airflow rate increases, the impact of any such errors will be reduced. Accordingly, in some implementations of method 62, the predetermined number of results that are calculated will vary inversely with the differential between the first and the second airflow rates.

At block 74, once the predetermined number of results has been obtained, an average result is calculated using a processor. In some implementations, the average result may be calculated by taking a simple average while in other implementations, the average result may be calculated by giving added weight to certain individual results based on any desirable factor including, but not limited to, the differential between airflow rates.

At block 76, the average result is reported to a user in the same manner described above with respect to method 50.

Figure 6:
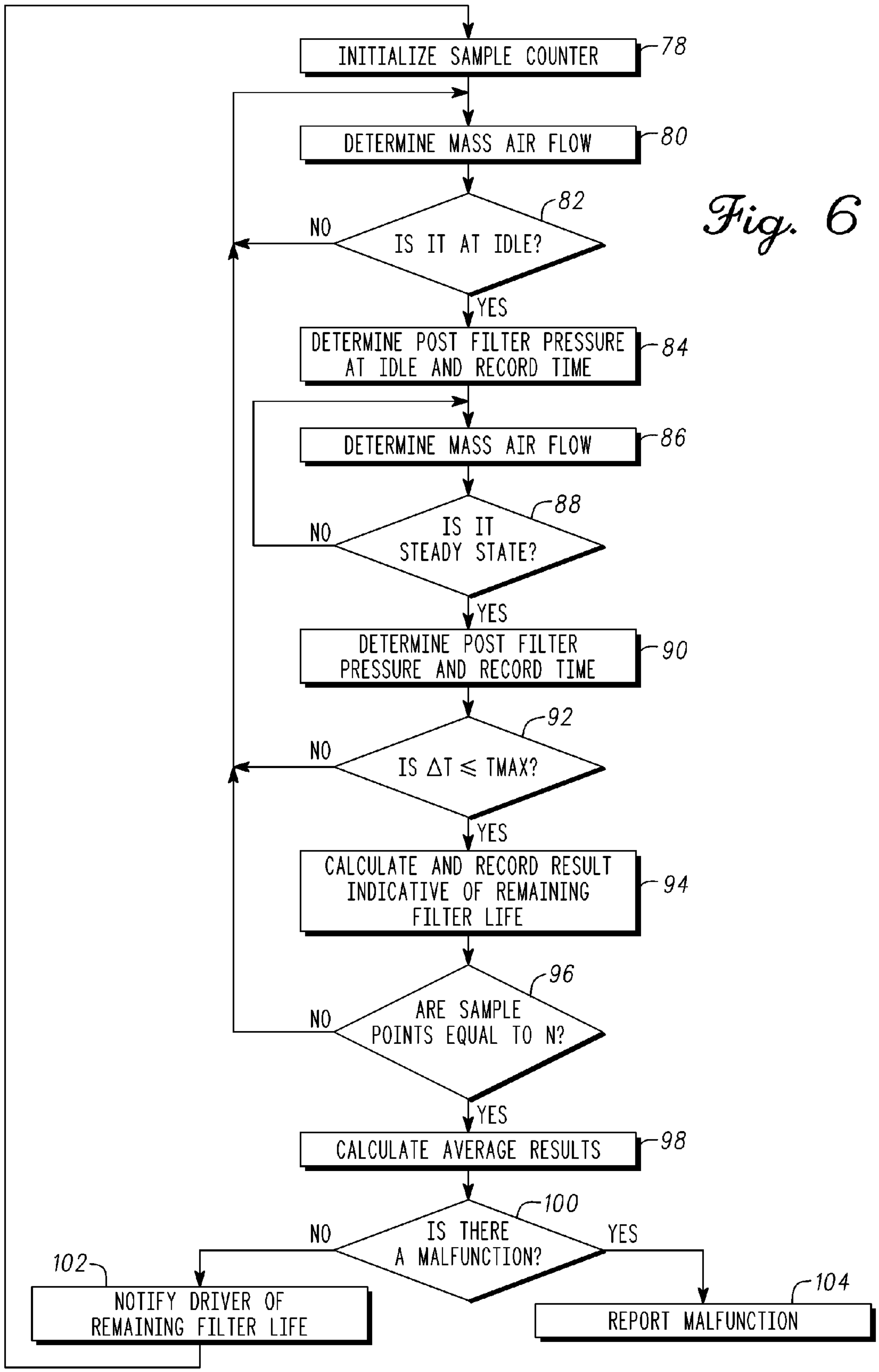
FIG. 6 is a flow chart illustrating an implementation of the method illustrated in FIG. 5.

FIG. 6 is a flow chart illustrating a non-limiting implementation of the method illustrated in FIG. 5. The various blocks and junctions illustrated in FIG. 6 may be incorporated into a computer program or other suitable software application. The implementation illustrated in FIG. 6 first seeks to obtain an air pressure measurement while the airflow rate is low (i.e., at idle) and then seeks to obtain an air pressure measurement while the airflow rate is higher than idle.

At block 78, a sample counter is initiated. The sample counter is used to determine when the predetermined number of results has been calculated. At block 80, the mass airflow rate is measured. At junction 82, the processor determines from the measured airflow rate if the internal combustion engine is operating at an idle condition. If it is not, then the software will return to block 80 and the mass air flow will be determined again and the sequence of steps and inquiries illustrated in blocks 80 and 82 will be repeated until an idle condition is detected. Once an idle condition is detected, at block 84, the air pressure is measured downstream of the air filter and the time of the measurement is recorded.

At block 86, the mass airflow rate is determined again. At junction 88, it is determined if the airflow rate is at a steady state above idle condition. If not, then the software will return to block 86 and the sequence of steps illustrated at blocks 86 and 88 will be repeated until a steady state mass airflow above idle is detected. Once such a condition is detected, then at block 90, the air pressure is again measured downstream of the air filter and the time of the measurement is recorded.

At junction 92, the time of the first and the second measurements are compared. If the elapsed time between the first and the second measurement exceeds a predetermined maximum, then the software returns to block 80 and the steps illustrated in blocks 80 through 90 are repeated. If the elapsed time between the first and the second measurement is less than or equal to the predetermined maximum, then at block 94, a result indicative of the useful life remaining for the air filter is calculated.

At junction 96, the number of calculated results is compared to a predetermined threshold. If the number of calculated results is less than the predetermined threshold, then the software returns to block 80 for the process to begin again. Once the number of calculated results reaches the predetermined threshold, then at block 98, the calculated results are averaged to determine an average result.

At junction 100, the software determines if a malfunction has occurred. A malfunction may include the detection of an incorrectly installed or missing air filter which may be determined by comparison of measured air pressure results with expected or typical results stored in a data storage device. If a malfunction is detected, then at block 102, a message is conveyed to a user such as by displaying a warning in the driver information center. If no malfunction is detected, then at block 104, the driver is notified of the useful life remaining for the air filter.

Figure 7:
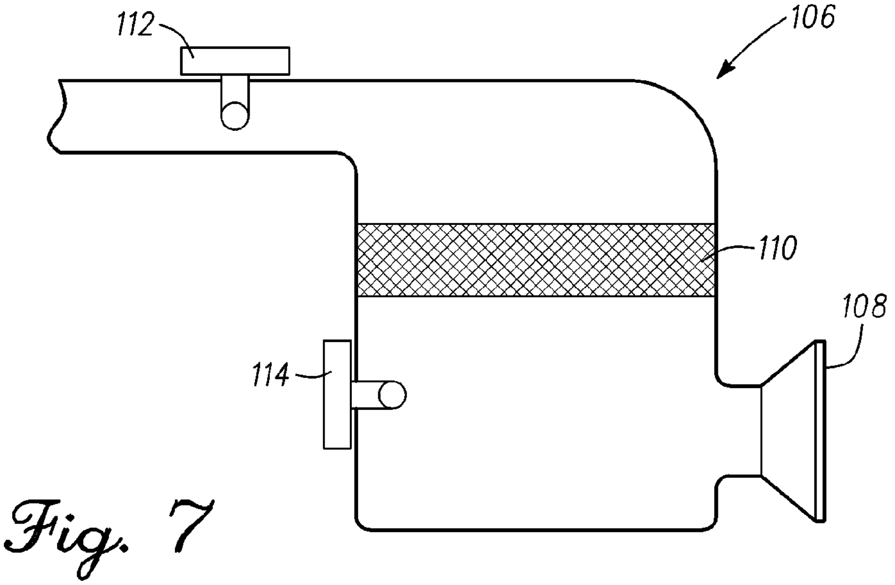
FIG. 7 is a simplified side view of an air cleaner assembly compatible for use with an alternate example of the method for determining the remaining useful life of an air filter.

FIG. 7 is a simplified side view of an air cleaner assembly 106 compatible for use with an alternate example of a method for determining the remaining useful life of an air filter. Air cleaner assembly 106 includes an inlet 108, an air filter 110, a sensor 112 and a sensor 114. Sensor 112 is configured to detect airflow rates and ambient air pressure. In other embodiments of air cleaner assembly 106, separate sensors may be used to separately detect airflow rates and ambient air pressure. Sensor 114 is configured to detect ambient air pressure. In still other embodiments, a differential pressure transducer may be utilized to measure the pressure drop across the air filter.

Air cleaner assembly 106 may be used on any vehicle having an internal combustion engine. Although air cleaner assembly 106 is discussed herein as being implemented on a vehicle, it should be understood that air cleaner assembly 106, as well as the method discussed below, may be implemented on any system, machine or device that utilizes an internal combustion engine, including, without limitation, landscaping and recreational equipment.

Air cleaner assembly 106 is configured to take air in through inlet 108 and to direct the air to flow through air filter 110 and then on to the internal combustion engine. As illustrated, sensor 112 is positioned within air cleaner assembly 106 at a location downstream of air filter 110 and sensor 114 is positioned upstream of air filter 110. Accordingly, sensor 112 may be used to detect the downstream air pressure of air flowing through air cleaner assembly 106 and sensor 114 may be used to detect atmospheric pressure.

As discussed above with respect to air cleaner assembly 20, additional components such as a processor and a data storage device may be utilized to control and coordinate the taking of, and the storage of, ambient and atmospheric air pressure measurements. For example, a processor may send an instruction to sensors 112 and 114 to measure the ambient air pressure ($P_1$) and the atmospheric pressure ($P_{atm}$), respectively. Sensors 112 and 114 may provide $P_1$ and $P_{atm}$ to the data storage device as well as the airflow rate at the time $P_1$ and $P_{atm}$ were measured. The computer processor may then obtain from the data storage device the pressure differentials across new and end-of-life air filters that correspond to the airflow rate at which $P_1$ was measured. Once the computer processor obtains $P_1$, and the pressure differentials ($A_1$ and $B_1$) from the data storage device, the computer processor can then perform the calculation indicated in equation #1, above, to determine a result indicative of the useful life remaining for air filter 110.

Figure 8:
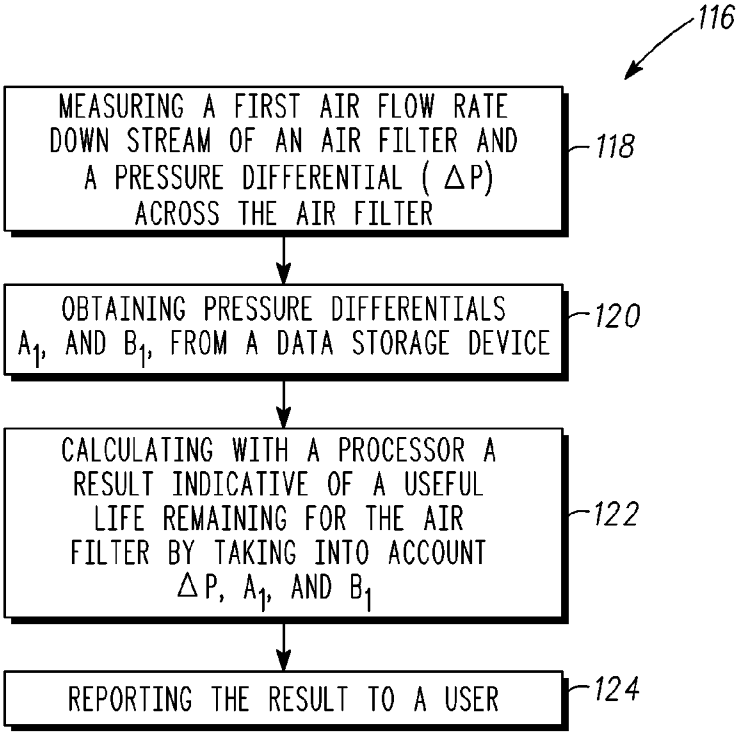
FIG. 8 is flow diagram illustrating the steps of a method that is compatible with the air cleaner assembly of FIG. 7, the method being capable of determining the remaining useful life of an air filter, according to yet another example.

FIG. 8 is flow diagram illustrating the steps of a method 116 that is compatible with air cleaner assembly 106 of FIG. 7, method 116 being capable of determining the remaining useful life of air filter 110, according to yet another example. It should be understood that method 116 is not limited to use with air cleaner assembly 106, but may also be performed utilizing other air cleaner assemblies as well.

At block 118, a first airflow rate is measured downstream of air filter 110 using sensor 112. Additionally, a downstream air pressure $P_1$ and an atmospheric pressure $P_{atm}$ are measured. $P_1$ and $P_{atm}$ may then be used to determine the pressure differential $\Delta P$ across air filter 110 by using a processor. In other embodiments, $\Delta P$ may be measured directly through the use of a differential pressure transducer.

At block 120, pressure differential data $A_1$ and $B_1$ are obtained from a data storage device. These data relate to the pressure differential across new and end-of-life air filters, respectively, measured at the first airflow rate.

At block 122, a result indicative of the useful life remaining for air filter 110 may be calculated with a processor by taking into account $\Delta P$, $A_1$ and $B_1$. In an embodiment, this result may be calculated using equation #1, set forth above.

At block 124, the result (i.e., the useful life remaining) is reported to a user in any of the manners discussed above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A method for determining a remaining useful life of an air filter, the method comprising the steps of:

measuring a first airflow rate and a first air pressure ($P_1$) in an air cleaner assembly downstream of the air filter, $P_1$ corresponding to the first airflow rate;

measuring a second airflow rate and a second air pressure ($P_2$) in the air cleaner assembly downstream of the air filter, $P_2$ corresponding to the second airflow rate;

obtaining pressure differentials across a new air filter at the first airflow rate ($A_1$), across the new air filter at the second airflow rate ($A_2$), across an end-of-life air filter at the first airflow rate ($B_1$) and across the end-of-life air filter at the second airflow rate ($B_2$) from a data storage device;

calculating with a processor a result indicative of a useful life remaining for the air filter by taking into account $P_1$, $P_2$, $A_1$, $A_2$, $B_1$, and $B_2$; and reporting the result to a user.

2. The method of claim 1, wherein $P_1$ and $P_2$ are measured when the first airflow rate and the second airflow rate have reached a steady state.

3. The method of claim 2, wherein the steady state occurs when fluctuations in measured air pressure do not exceed a predetermined threshold.

4. The method of claim 2, wherein P1 and P2 are measured after a predetermined period of time has elapsed subsequent to a change in throttle condition.

5. The method of claim 1, wherein P1 and P2 are measured within a predetermined period of time of one another.

6. The method of claim 1, wherein the calculating step includes taking into account an additional factor relating to a user directive.

7. The method of claim 6, wherein the additional factor increases the useful life remaining of the air filter.

8. The method of claim 6, wherein the additional factor decreases the useful life remaining of the air filter.

9. The method of claim 1, wherein $P_2$ is measured when a difference between the first airflow rate and the second airflow rate exceeds a predetermined threshold.

10. A method for determining a remaining useful life of an air filter, the method comprising the steps of:

(a) measuring a first airflow rate and a first air pressure ($P_1$) in an air cleaner assembly downstream of the air filter, $P_1$ corresponding to the first airflow rate;

(b) measuring a second airflow rate and a second air pressure ($P_2$) in the air cleaner assembly downstream of the air filter, $P_2$ corresponding to the second airflow rate;

(c) obtaining pressure differentials across a new air filter at the first airflow rate ($A_1$), across the new air filter at the second airflow rate ($A_2$), across an end-of-life air filter at the first airflow rate ($B_1$) and across the end-of-life air filter at the second airflow rate ($B_2$) from a data storage device;

(d) calculating with a processor a result indicative of a useful life remaining for the air filter by taking into account $P_1$, $P_2$, $A_1$, $A_2$, $B_1$, and $B_2$;

(e) repeating steps (a) through (d) until a predetermined number of results has been calculated;

(f) calculating an average result by averaging the predetermined number of results with the processor; and (g) reporting the average result to a user.

11. The method of claim 10, wherein the predetermined number of results varies inversely with a difference between the first airflow rate and the second airflow rate.

12. The method of claim 10, wherein the first air pressure and the second air pressure are measured when the first airflow rate and the second airflow rate have reached a steady state.

13. The method of claim 12, wherein the steady state occurs when fluctuations in measured air pressure do not exceed a predetermined threshold.

14. The method of claim 12, wherein the first air pressure and the second air pressure are measured after a predetermined period of time has elapsed subsequent to a change in throttle condition.

15. The method of claim 10, wherein the first air pressure and the second air pressure are measured within a predetermined period of time of one another.

16. The method of claim 10, wherein step (d) includes taking into account an additional factor relating to a user directive.

17. The method of claim 16, wherein the additional factor increases the useful life remaining of the air filter.

18. The method of claim 16, wherein the additional factor decreases the useful life remaining of the air filter.

19. The method of claim 10, wherein the second air pressure is not measured until a difference between the first airflow rate and the second airflow rate exceeds a predetermined threshold.

20. A method for determining a remaining useful life of an air filter, the method comprising the steps of:

measuring a first airflow rate in an air cleaner assembly downstream of the air filter and a pressure differential ($\Delta P$) across the air filter, the pressure differential corresponding to the first airflow rate;

obtaining pressure differentials across a new air filter at the first airflow rate ($A_1$) and across an end-of-life air filter at the first airflow rate ($B_1$) from a data storage device;

calculating with a processor a result indicative of a useful life remaining for the air filter by taking into account $\Delta P$, $A_1$, and $B_1$, and reporting the result to a user.

* * * * *